Patented Feb. 16, 1932

1,845,632

UNITED STATES PATENT OFFICE

WILLIAM L. SPALDING, OF BUFFALO, NEW YORK, ASSIGNOR TO NATIONAL ANILINE AND CHEMICAL CO., INC., OF NEW YORK, N. Y., A CORPORATION OF NEW YORK

METHOD OF OBTAINING ELEVATED TEMPERATURES

No Drawing.  Application filed November 21, 1925. Serial No. 70,718.

This invention relates to a method of elevating temperatures by means of exothermic reactions, and more particularly to a method of carrying out a chemical reaction which occurs in the presence or under the influence of sulfuric acid.

It is frequently necessary that reactions be carried out under conditions, such as the avoidance of direct firing, that restrict operations to the use of jacket steam; but a simultaneous requirement of temperatures higher than can be safely reached with jacket steam is often present.

According to the present invention elevated temperatures are made possible under such conditions by providing a component in a gaseous condition that combines exothermically with another component. For example, by diluting a reagent with steam the latent heat of vaporization is released in conjunction with the heat of dilution and together they give a combined heat supply that results in a marked temperature increase.

Thus in a reaction which takes place in a medium of sulfuric acid, temperatures higher than those which can be safely reached by indirect steam heating can be readily obtained either by heating the reaction mixture, by means of indirect steam heating, to the temperature of the available steam and then passing steam directly into the reaction mixture, or by passing superheated steam into the reaction mixture. If the reaction requires a minimum concentration of sulfuric acid, a sulfuric acid can be initially used whose concentration is such that taking into consideration the amount of water to be added in the form of steam, the resulting concentration will be that required. Data are available from which the required amount, concentration, and temperature of the sulfuric acid initially employed and the amount and temperature of the steam to be added can be readily determined for any set of reaction conditions.

For example, in a process wherein the reaction is to be carried out at about 180° C. with a reaction mixture of about 538 lbs. of ingredients including approximately 400 lbs. of sulfuric acid the minimum allowable concentration of which is about 96% sulfuric acid, and a maximum temperature of about 150° C. is obtainable by indirect steam heating, it can be readily determined how much sulfuric acid of 100% concentration and how much steam will be required to produce said reacting conditions.

Sulfuric acid (100%) when admixed in molar proportions with water liberates a heat of dilution of about 640 B. t. u. for each pound of water, while 1 lb. of steam at 10 lbs. gauge pressure has a latent heat of approximately 950 B. t. u. The total heat therefore available by dilution of 100% sulfuric acid with steam at 10 lbs. gauge pressure is accordingly approximately 1600 B. t. u. per pound of steam at 10 lbs. gauge pressure.

Assuming that the heat equivalent of the 538 lb. charge of reacting material is 215 lbs. and that of the apparatus is about 340 lbs., and disregarding the heat losses due to radiation and conduction, the amounts of steam, at 10 lbs. pressure, and of 100% sulfuric acid necessary to produce a temperature rise sufficient to bring the reaction mixture to about 180° C. (a rise of about 30° C.) can be readily calculated. Thus, with a batch containing 400 lbs. of 100% sulfuric acid, about 19 lbs. of steam at 10 lbs. gauge pressure will be required, and the concentration of the resulting sulfuric acid solution will be approximately 96% $H_2SO_4$.

If sulfuric acid of greater concentration than 96% is required, oleum can be used, inasmuch as a 100% sulfuric acid or an acid containing a percentage of sulfuric anhydride results from the addition to oleum of a molar proportion or less of steam for the free sulfuric anhydride content of the oleum. If sulfuric anhydride is used initially, less steam will be required to obtain an equivalent elevation of temperature, since the heat of dilution evolved per pound of water when sulfuric anhydride is mixed in molar proportions with water is about 2130 B. t. u., and this added to the latent heat of 1 lb. of steam at 10 lbs. gauge pressure, or approximately 950 B. t. u., gives a total of 3080 B. t. u. per pound of steam at 10 lbs. gauge pressure.

As illustrative of the invention the following specific application to the manufacture of quinizarine is given. It is to be understood, however, that the invention is not limited thereto but has other applications within the scope of the appended claims.

According to one method for the manufacture of quinizarine, there is added to 80 parts of phthalic anhydride, 20 parts of boric acid and 23 parts of parachlorophenol, 400 parts of sulfuric acid (96 percent); the mixture is heated for 3 hours to 150° C., and the temperature is then raised to from 180 to 200° C. The temperature of 180° C. is higher than is practically attainable with the use of jacket steam, and it has heretofore been the practice to use an oil jacket or direct fire heating. These have disadvantages, however; an oil jacket requires considerable time for adjustment of temperature and also requires expensive equipment, and direct fire heating causes local overheating and decomposition.

In carrying out said process in accordance with the present invention, the charge is raised to 150° C. or thereabouts by the use of jacket steam, and the remaining increase in temperature is obtainable by passing about 19 lbs. of steam at 10 lbs. gauge pressure into the reaction mixture.

The following considerations will make this evident. The heat of dilution of 400 pounds of 100 percent sulfuric acid diluted with water (about 19 pounds) to give about a 96 percent acid is about 12,000 B. t. u. (Transactions Am. Inst. Chem. Eng'rs., vol. 14, p. 5); and the latent heat of 19 pounds of steam at 10 pounds gage pressure is about 18,000 B. t. u. Therefore by adding 19 pounds of steam under such a pressure to 400 pounds of 100 percent sulfuric acid, the heat released is the sum of these two or about 30,000 B. t. u. If the heat equivalent of the 538 pound charge be taken as 215 pounds, that of the kettle and its parts as 340 pounds, and the losses from radiation and conduction be disregarded, the temperature rise due to the dilution of the 100 percent sulfuric acid with the steam will be about 30° C. (54° F.).

To control the amount of steam added a separate boiler or vessel can be used which is supplied with the requisite amount of water and then heated, by a steam jacket or otherwise, to generate the steam.

It is to be observed that the final temperature is not limited by that of the injected steam, and it is higher than that of the acid to which it is added. Furthermore this method of heating affords a rapid and substantially uniform rise in temperature in the reaction mass; and it is especially adapted to reactions where high temperatures are not permissible during a preliminary step.

I claim:

1. A process for carrying out a chemical reaction in the presence of sulfuric acid and at an elevated temperature which comprises passing steam into a reaction mixture containing sulfuric acid of a concentration of about 100 per cent.

2. In the manufacture of quinizarine by a process including heating a reaction mixture comprising 96 per cent sulfuric acid at a temperature above about 150° C., the improvement which comprises heating a reaction mixture containing sulfuric acid of about 100 per cent concentration to a temperature of about 150° C. by means of indirect steam heat, and then raising the temperature and diluting the reaction mixture by passing into the reaction mixture sufficient steam to form 96 per cent sulfuric acid.

3. In a process of carrying out a chemical reaction which requires the presence of sulfuric acid of a minimum concentration at an elevated temperature, the improvement which comprises incorporating in the reaction mixture sulfuric acid of a concentration greater than said minimum concentration, and heating said reaction mixture by diluting it with steam in an amount not in excess of the amount required to reduce the concentration of said sulfuric acid to said minimum.

4. A process for carrying out a chemical reaction in the presence of sulfuric acid of about 96 per cent. strength and at an elevated temperature which comprises passing steam into a reaction mixture containing sulfuric acid of a concentration greater than 96 per cent. in an amount sufficient to form 96 per cent. sulfuric acid.

5. A process for carrying out a chemical reaction in the presence of sulfuric acid and at an elevated temperature which comprises preheating a reaction mixture containing sulfuric acid of about 100 per cent. strength by means of indirect steam heat, and diluting said sulfuric acid reaction mixture with steam whereby the reaction mixture is further heated.

6. In a process of carrying out a chemical reaction which requires the presence in the reaction mixture of sulfuric acid of a minimum concentration at a temperature above 150° C., the improvement which comprises heating a reaction mixture containing sulfuric acid of a concentration greater than said minimum concentration to a temperature of about 150° C. by means of indirect steam heat, and then raising the temperature and diluting the reaction mixture by passing steam into the reaction mixture in an amount just sufficient to reduce the concentration of said sulfuric acid to said minimum.

7. In the manufacture of quinizarine by a process including heating a reaction mixture comprising 90 per cent. sulfuric acid at a temperature above about 150° C., the improvement which comprises heating a reaction mixture containing sulfuric acid having a concentration greater than 96 per cent. to a temperature of about 150° C. by means of indirect steam heat, and then raising the temperature and diluting the reaction mixture by passing into the reaction mixture sufficient steam to form 96 per cent. sulfuric acid.

In testimony whereof I affix my signature.

WILLIAM L. SPALDING.